US009420436B2

(12) United States Patent
Xu et al.

(10) Patent No.: US 9,420,436 B2
(45) Date of Patent: Aug. 16, 2016

(54) GROUP MANAGING METHOD AND PUSH SERVER

(71) Applicant: Huawei Technologies Co., Ltd., Shenzhen, Guangdong (CN)

(72) Inventors: Xiaoying Xu, Shenzhen (CN); Xiaoxiao Zheng, Shenzhen (CN); Lingli Pang, Shenzhen (CN); Qufang Huang, Shenzhen (CN); Qinghai Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 280 days.

(21) Appl. No.: 13/972,488

(22) Filed: Aug. 21, 2013

(65) Prior Publication Data

US 2013/0337860 A1  Dec. 19, 2013

Related U.S. Application Data

(63) Continuation of application No. PCT/CN2012/070835, filed on Feb. 2, 2012.

(30) Foreign Application Priority Data

Feb. 21, 2011  (CN) .......................... 2011 1 0042567

(51) Int. Cl.
*H04W 4/08* (2009.01)
*H04L 29/08* (2006.01)

(52) U.S. Cl.
CPC ....... *H04W 4/08* (2013.01); *H04L 67/26* (2013.01)

(58) Field of Classification Search
CPC ..... H04W 4/08; H04W 76/002; H04W 76/022; H04L 51/38; H04L 67/26
See application file for complete search history.

(56) References Cited

U.S. PATENT DOCUMENTS

| 7,107,066 | B2 * | 9/2006 | Toth et al. .................... 455/458 |
| 7,289,462 | B1 * | 10/2007 | Mizell et al. .................. 370/328 |

(Continued)

FOREIGN PATENT DOCUMENTS

| CN | 101018168 A | 8/2007 |
| CN | 101043252 A | 9/2007 |

(Continued)

OTHER PUBLICATIONS

International Search Report in corresponding PCT Patent Application No. PCT/CN2012/070835 (May 3, 2012).

(Continued)

*Primary Examiner* — Fanghwa Wang
(74) *Attorney, Agent, or Firm* — Leydig, Voit & Mayer, Ltd.

(57) ABSTRACT

The present invention provides a group managing method and a PUSH Server. The method comprises: allocating a first group identifier to a group in an Application Server (AS); acquiring, according to a first identifier of a user joining the group, parameter information of the user, wherein the parameter information of the user comprises a second identifier of the user, location information of a user equipment (UE) corresponding to the user, and an identifier indicating whether the user enables reception of PUSH notification; establishing a group-based transmission bearer with a core network node; and generating group context corresponding to the first group identifier, wherein the group context comprises parameter information of the user in the group and information of the transmission bearer. Therefore, the group management efficiency is improved.

20 Claims, 6 Drawing Sheets

(56) References Cited

U.S. PATENT DOCUMENTS

| | | | |
|---|---|---|---|
| 8,891,423 B2* | 11/2014 | Shaheen et al. | 370/311 |
| 2002/0131395 A1* | 9/2002 | Wang | 370/349 |
| 2003/0123423 A1* | 7/2003 | Okanoue | H04W 24/00 370/338 |
| 2005/0002407 A1* | 1/2005 | Shaheen et al. | 370/401 |

FOREIGN PATENT DOCUMENTS

| | | |
|---|---|---|
| CN | 101150533 A | 3/2008 |
| CN | 101827309 A | 9/2010 |
| CN | 101931859 A | 12/2010 |

OTHER PUBLICATIONS

Written Opinion of the International Searching Authority in corresponding PCT Patent Application No. PCT/CN2012/070835 (May 3, 2012).

"3GPP TS 23.246—$3^{rd}$ Generation Partnership Project; Technical Specification Group Services and System Aspects; Multimedia Broadcast/Multicast Service (MBMS); Architecture and functional description (Release 9)," Version 9.5.0, $3^{rd}$ Generation Partnership Project, Valbonne, France (Jun. 2010).

* cited by examiner

GROUP MANAGING METHOD AND PUSH SERVER

CROSS-REFERENCE TO RELATED APPLICATIONS

This application is a continuation of International Patent Application No. PCT/CN2012/070835, filed on Feb. 2, 2012, which claims priority to Chinese Patent Application No. 201110042567.1, filed on Feb. 21, 2011, both of which are hereby incorporated by reference in their entireties.

TECHNICAL FIELD

The embodiments of the present invention relates to the field of communication, and particularly, to a group managing method and a PUSH Server.

BACKGROUND

With the widespread usage of the smart User Equipment (UE) (e.g., the mobile phone), applications on the UE are increasingly richer. Application services, such as microblog and social network instant messaging (e.g., Twitter, Facebook, QQ and MSN) are more and more popular in the users.

With regard to application services such as Twitter, Facebook, QQ and Msn, users corresponding to the UEs are usually managed on a group basis in corresponding Application Server (AS) according to the users' requirement. For example, the same message is usually sent to all users in one group. However, the UEs in the same group in the AS will not be uniformly managed at the network side. For example, with regard to services such as QQ and Msn, a message is usually sent to each UE in the group through the Gateway GPRS Support Node (GGSN) and the Serving GPRS Support Node (SGSN) in the Core Network (CN), and the Radio Network Controller (RNC) and the NodeB (NB) in the Universal Mobile Telecommunication System Terrestrial Radio Access Network (UTRAN), respectively. With regard to services such as Twitter and Facebook, corresponding AS adopts the instant pushing mode, i.e., generally pushing a message to each UE in the group through the GGSN and the SGSN in the CN, and the RNC and the NB in the UTRAN, respectively. The two mechanisms of PUSH message usually adopted in the Twitter service are POLL and PUSH, and the prior art mainly uses the POLL mode, in which the UE actively acquires the group message from the AS of the Twitter service. In the PUSH mode, the AS of the Twitter service will notify the UE to acquire the group message only if a topic to which the user corresponding to the UE subscribes is updated. As compared with the POLL mode, the PUSH mode generates less signaling, and does not need to frequently send a refresh request to the AS.

During the process of implementing the present invention, the inventor finds that the prior art at least has a problem that in the implementation of the PUSH mechanism of the prior art, the UEs in the same group cannot be uniformly managed at the network side based on the groups in the AS.

SUMMARY

The aspects of the present invention provide a group managing method and a PUSH Server, so as to solve the defect in the prior art that the UEs in the same group cannot be uniformly managed at the network side based on the groups in the AS.

An aspect of the present invention provides a group managing method, comprising: allocating a first group identifier to a group in an AS; acquiring, according to a first identifier of a user joining the group, parameter information of the user in a mobile network, wherein the parameter information of the user comprises a second identifier of the user, location information of a UE corresponding to the user, and an identifier indicating whether the user enables reception of PUSH notification; establishing a group-based transmission bearer with a core network node; and generating a group context corresponding to the first group identifier, wherein the group context comprises the parameter information of the user in the group and information of the transmission bearer.

Another aspect of the present invention provides a PUSH Server, comprising: an allocating module configured to allocate a first group identifier to a group in an AS; an acquiring module configured to acquire, according to a first identifier of a user joining the group, parameter information of the user in a mobile network, wherein the parameter information of the user comprises a second identifier of the user, location information of a UE corresponding to the user, and an identifier indicating whether the user enables reception of PUSH notification; an establishing module configured to establish a group-based transmission bearer with a core network node; and a generating module configured to generate a group context corresponding to the first group identifier, wherein the group context comprises the parameter information of the user in the group and information of the transmission bearer.

The above described group managing method and PUSH Server allocate a first group identifier to a group in an AS; acquire, according to a identifier of a user joining the group, parameter information of the user, wherein the parameter information of the user comprises a identifier of the user, location information of a UE corresponding to the user, and an identifier indicating whether the user enables reception of PUSH notification; establish a group-based transmission bearer with a core network node; and generate a group context corresponding to the group identifier, wherein the group context comprises the parameter information of the user in the group and information of the transmission bearer. Through the technical solutions of the embodiments of the present invention, a uniform management of the users in the same group in the AS can be performed according to the generated group context, thereby solving the defect in the prior art that the users in the same group cannot be managed uniformly based on the groups in the AS, and effectively improving the group management efficiency.

BRIEF DESCRIPTION OF THE DRAWINGS

In order to more clearly describe the technical solutions in the prior art or the embodiments of the present invention, the accompanying drawings to be used in the descriptions of the prior art or the embodiments are briefly introduced as follows. Obviously, the following accompanying drawings just illustrate some embodiments of the present invention, and a person skilled in the art can obtain other drawings from these drawings without paying a creative effort.

DESCRIPTION OF EMBODIMENTS

Figure 1:
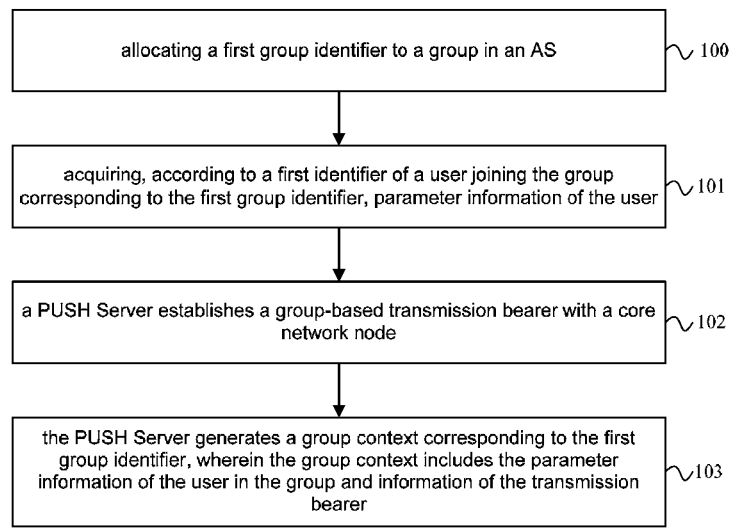
FIG. 1 is a flowchart of a group managing method provided by an embodiment of the present invention.

In order to make the objects, technical solutions and advantages of the present invention more clear, the technical solutions of the embodiments of the present invention will be clearly and completely described as follows with reference to the accompanying drawings. Apparently, the embodiments as described below are merely partial, rather than the entire, embodiments of the present invention. Based on the embodiments of the present invention, any other embodiment obtained by a person skilled in the art without paying any creative effort shall fall within the protection scope of the present invention.

The technical solutions of the present invention can be applied to various communication systems, such as Global System for Mobile communications (GSM), Code Division Multiple Access (CDMA) system, Wideband Code Division Multiple Access Wireless (WCDMA), General Packet Radio Service (GPRS) and Long Term Evolution (LTE).

In addition, respective aspects will be described herein in conjunction with the User Equipment (UE) and/or the base station. The UE may refer to a device that provides the user with voices and/or data connectivity. The UE may be connected to a computing device such as laptop computer or desktop computer, or other communication device such as a self-contained device like the Personal Digital Assistant (PDA). The wireless terminal may also be called as system, subscriber unit, subscriber station, mobile station, mobile, remote station, access point, remote terminal, access terminal, user terminal, user agent, user device or user equipment. The UE may be subscriber station, wireless device, cellular phone, Personal Communication Service (PCS) phone, cordless phone, Session Initiation Protocol (SIP) phone, Wireless Local Loop (WLL) station, Personal Digital Assistant (PDA), handheld device having the wireless connection function, or other processing device connected to the wireless modem.

The base station (e.g., access point) may refer to a device in an access network which communicates with the wireless terminal through one or more sectors at the air interface. The base station may be used to convert the received air frame and the Internet Protocol (IP) packet into each other, as a router between the wireless terminal and the rest part of the access network, wherein the rest part of the access network may include an IP network. The base station may further coordinate an attribute management of the air interface. For example, the base station may be a Base Transceiver Station (BTS) in the GSM or CDMA, a NodeB in the WCDMA, or an evolutional NodeB (eNB or e-NodeB) in the LTE, and herein is not limited.

Respective aspects will be described in the form of a system that may include one or more devices, components, modules or units. It shall be understood or appreciated that various systems may include additional devices, components, modules and/or units, and/or not include all those devices, components, modules and units discussed with reference to the drawings. In another aspect of the present invention, combinations of the above measures may be employed.

In addition, the term "and/or" herein is just an association relation that describes the associated objects, and it indicates that there may be three relations. For example, A and/or B may indicate the following three conditions: A is existed separately, A and B are existed at the same time, and B is existed separately. In addition, the character "/" generally indicates that the relation between the associated objects is "or".

FIG. 1 is a flowchart of a group managing method provided by an embodiment of the present invention. The executive subject of the group managing method herein is a PUSH Server, which may be a logical function entity, an individual entity or an individual physical entity. In the practical applications, the PUSH Server may be provided at the network side together with the Gateway GPRS Support Node (GGSN), or independent from the GGSN and connected thereto. As illustrated in FIG. 1, the group managing method of the embodiment may include:

100: allocating a first group identifier to a group in an Application Server (AS).

Specifically, the group is a user group. Each user group in the AS is allocated with a group identifier, and different user groups in the AS are allocated with different group identifiers. For example each user group in the AS is allocated with a first group identifier that uniquely identifies the user group in the AS.

101: acquiring, according to a first identifier of a user joining the group corresponding to the first group identifier, parameter information of the user.

In which, the parameter information of the user includes a second identifier of the user, location information of a UE corresponding to the user, and an identifier indicating whether the user enables reception of PUSH notification. For example, the first and second identifiers may be the same as or different from each other. For example, the first identifier herein may be a private IP of the user, a Temporary Mobile Subscriber Identity (TMSI), a Packet-TMSI (P-TMSI) or a user name, wherein the private IP may be an IP of the user in a Public Land Mobile-communication Network (PLMN). The second identifier may be a TMSI, a P-TMSI or an International Mobile Subscriber Identity (IMSI). When the first identifier is a private IP or a user name, corresponding second identifier may be an IMSI of the user, and if the user has been activated in a core network, corresponding second identifier may also be a TMSI or a P-TMSI. Similarly, when the first identifier is a TMSI or a P-TMSI, corresponding second identifier may be an IMSI of the user, and if the user has been activated in the core network, corresponding second identifier may also be a TMSI or a P-TMSI. In which, the IMSI of the user is an identification code for uniquely identifying the user in the mobile network.

In the embodiment, the identifier indicating whether the user enables reception of PUSH notification means that when there is an updated group message in the group, the PUSH Server sends the group message to the user in the group through a PUSH mechanism. When the reception of PUSH notification is enabled, the user can receive the group message of itself in the group in the AS forwarded by the PUSH Server, and when the reception of PUSH notification is disenabled, the user cannot receive the group message of itself in the group in the AS forwarded by the PUSH Server.

102: a PUSH Server establishes a group-based transmission bearer with a core network node.

In which, the core network node is a GGSN or a Serving GPRS Support Node (SGSN). For example, when the PUSH Server is integrated with the GGSN, it can be deemed that the PUSH Server integrates all the functions of the GGSN, and then the core network node is regarded as the SGSN. When the PUSH Server and the GGSN are provided separately, the core network node may be regarded as the SGSN.

103: the PUSH Server generates a group context corresponding to the first group identifier, wherein the group context includes the parameter information of the user in the group and information of the transmission bearer.

For example, in the embodiment, step 100 may further comprise pre-allocating, by the PUSH Server, a corresponding first group identifier to a group in the AS before the group is generated in the AS, or allocating, by the PUSH Server, a corresponding first group identifier to a group in the AS after the group is generated and when the first user joins the group, or allocating, by the PUSH Server, a corresponding first group identifier to a group according to a request for allocating a group identifier for the group sent by the AS, after the group is generated in the AS, and when the number of users enabling reception of PUSH notification exceeds a predetermined threshold. For example, the first group identifier may include two parts, e.g., Public Land Mobile-communication Network (PLMN) ID and Group ID. In which, the Group ID may be an identifier corresponding to the group in the AS, and it may be called as a second group identifier so as to be distinguished from the first group identifier in the PUSH Server. The first group identifier is a unique identifier used in the mobile network and transmitted at the air interface, and the second group identifier is an identifier used by the UE in the AS.

In the embodiment, the location information of the UE corresponding to the user may be route area information or location area information of the UE, e.g., it may include the address or identifier of the GGSN and the SGSN corresponding to the UE, provided that the UE corresponding to the user can be accurately located through the route area information or the location area information.

The group managing method of the embodiment allocates a first group identifier to a group in an AS; acquires, according to a first identifier of a user joining the group, parameter information of the user, wherein the parameter information of the user includes a second identifier of the user, location information of a UE corresponding to the user, and an identifier indicating whether the user enables reception of PUSH notification; establishes a group-based transmission bearer with a GGSN; and generates group context corresponding to group identifiers, wherein the group context includes parameter information of the user in the group and information of the transmission bearer. Through the technical solution of the embodiment, a uniform management of users in the same group in the AS can be performed according to the generated group context, which solves the defect in the prior art that the users in the same group cannot be managed uniformly based on groups in the AS, and effectively improves the group management efficiency.

To be noted, on the basis of the above technical solution, preferably, before step 100 the group managing method may include setting, in the PUSH Server, a predetermined threshold of the number of users enabling reception of PUSH notification. The PUSH Server may detect the number of users enabling reception of PUSH notification in the group and compare it with the predetermined threshold, and steps 100 to 103 are performed when the number of users enabling reception of PUSH notification in the group reaches the predetermined threshold.

In the above solution, the PUSH mechanism will not be started unless the number of users enabling reception of PUSH notification in the group reaches the predetermined threshold, thereby preventing the PUSH mechanism from being started when there are only a small number of users in the group, and avoiding the resource waste.

To be noted, following step 100 of the embodiment, the PUSH Server may establish a mapping relation between the first group identifier and a second group identifier corresponding to the group in the AS, after allocating the first group identifier to the group in the AS. Thus, for example when the AS sends a joining request of the user to the PUSH Server, the joining request may include the IP address of the user and the second group identifier, and the PUSH Server can acquire that the user joins the group corresponding to the first group identifier according to the mapping relation between the first group identifier and the second group identifier.

Between steps 100 and 101 of the embodiment, the group managing method may further include: the PUSH Server detects that the user joins the group in the AS.

In which, the PUSH Server may specifically detect the joining request for the user to join the group in the AS in the following three modes:

1) The PUSH Server receives from the AS a joining request that carries the second group identifier or the first group identifier corresponding to the group joined by the user, and the IP address of the user.

Such type of joining request indicates that the user has successfully joined the group in the AS, and at that time, the joining request sent by the AS to the PUSH Server carries the public IP of the user.

2) The PUSH Server directly receives from the UE a joining request that carries the second group identifier or the first group identifier corresponding to the group joined by the user, and the IP address of the user.

In that case, the UE may directly communicate with the PUSH Server, i.e., it can be deemed that a PUSH Client is provided in the UE. The PUSH Client in the UE may directly communicate with the PUSH Server. After the user corresponding to the UE successfully joins the group in the AS, the UE may directly send to the PUSH Server a joining request that carries a first identifier of the user, and a second group identifier of the group in the AS joined by the user or a first group identifier corresponding to the second group identifier in the PUSH Server. In the embodiment, the identifier of the user may be private IP, TMSI or P-TMSL of the user in the PLMN.

3) The PUSH Server parses a joining request sent by the GGSN to the AS, wherein the joining request also carries a second group identifier or a first group identifier corresponding to the group joined by the user, and the IP address of the user.

In that case, the identifier of the user may be private IP, TMSI or P-TMSL of the user in the PLMN. Preferably, after parsing the joining request sent by the GGSN to the AS, the PUSH Sever may further parse a joining response sent by the AS to the GGSN, wherein the joining response carries a first identifier of the user and corresponding second group identifier or first group identifier of the group joined by the user, and in that case, the first identifier of the user may be the public IP of the user.

Correspondingly, the PUSH Server may parse the joining request of the user sent by the GGSN to the AS, and the joining response returned by the AS to the GGSN. After parsing the joining response, the PUSH Server may detect and acquire the joining request of the user joining the group between steps 100 and 101 of the embodiment by applying the above mentioned modes. Next, the PUSH Server may add corresponding parameter information of the user to the group context of the corresponding PUSH Server according to the joining request of the user.

When the GGSN and the PUSH Server are provided separately, the core network node includes the GGSN and the SGSN. In that case, in step 101 of the above embodiment, acquiring, according to the first identifier of the user joining the group, the parameter information of the user specifically may include: the PUSH Server acquires, according to the first identifier of the user joining the group, the parameter information of the user from the GGSN, the SGSN, a Home Subscriber Service (HSS) or a Home Location Register (HLR).

Figure 2:
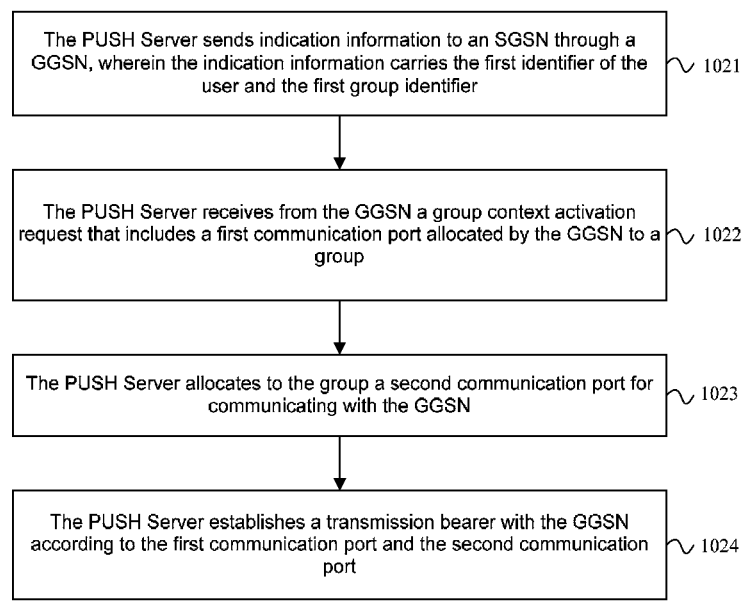
FIG. 2 is a flowchart of a group managing method provided by another embodiment of the present invention.

FIG. 2 is a flowchart of a group managing method provided by another embodiment of the present invention. As illustrated in FIG. 2, the group managing method of the embodiment is based on the embodiment corresponding to FIG. 1, and the core network node includes the GGSN and the SGSN, wherein step 102 "establishing a group-based transmission bearer with the GGSN" specifically may include:

1021: the PUSH Server sends indication information to the SGSN through the GGSN, wherein the indication information carries a first identifier of the user and a first group identifier.

For example, the indication information is used to indicate the SGSN to notify users in the group to activate group context corresponding to the first group identifier. For example, the SGSN indicating the users to activate the group context may be sent to the UE corresponding to the user having the first identifier through a Radio Network Controller (RNC) and a NodeB.

1022: the PUSH Server receives from the GGSN a group context activation request that includes a first communication port allocated by the GGSN to the group.

For example, the group context activation request is sent by the GGSN upon a generated group context activation request sent by the SGSN, while the generated group context activation request is sent by the SGSN upon the group context activation request sent by the UE.

1023: the PUSH Server allocates to the group a second communication port for communicating with the GGSN.

For example, the second communication port allocated by the PUSH Server to the group for communicating with the GGSN is corresponding to the first communication port, so as to subsequently transmit a group message corresponding to the first group identifier between the PUSH Server and the GGSN, according to the second communication port and the first communication port, i.e., to realize a group-based communication between the PUSH Server and the GGSN.

1024: the PUSH Server establishes a transmission bearer with the GGSN according to the first and second communication ports.

For example, transmission bearers are also established between the GGSN and the SGSN, the SGSN and the RNC in addition to be established between the PUSH Server and the GGSN.

When receiving a notification to activate the group context, the UE sends a group context activation request to the SGSN, then the SGSN generates a group context according to the received group context activation request and sends a generated group context activation request to the GGSN, while the GGSN generates a group context after receiving the generated group context activation request sent by the SGSN. Next, the GGSN sends a group context activation request to the PUSH Server to notify it that the UE has sent the group context activation request. In which, the request sent by either the SGSN or the GGSN to a parent node carries a communication port with the parent node allocated to the group. Correspondingly, after receiving the group context activation request, the PUSH Server returns a group context activation response to the GGSN, and the GGSN returns the group context activation response to the GGSN. After receiving the group context activation response, the SGSN establishes a group-based Radio Access Bearer (RAB) with the RNC to subsequently send the group message. In addition, the SGSN also returns the group context activation response to the UE to notify it that the group context activation request is successful.

In which, each node among the PUSH Server, the GGSN, the SGSN and the RNC feeds back to corresponding child node the group context activation response which carries a communication port allocated by the current node to the group for communicating with the child node. In which, the group activation request initiated by the UE specifically may be a Packet Data Protocol (PDP) group context activation request. Thus, the uplink and downlink communication ports can be obtained in the GGSN and the SGSN, so as to establish the transmission bearers between the GGSN and the SGSN as well as the SGSN and the RNC.

Through the above technical solution, the group managing method of the embodiment can establish a group-based transmission bearer between the PUSH Server and the GGSN, so as to subsequently transmit corresponding group message of the group between the PUSH Server and the GGSN, and send the group message to each UE under the SGSN in the group through the transmission bearer once for all. The technical solution of the embodiment can effectively improve the group management efficiency at the network side.

To be noted, after step 103 of the above embodiment, it may further require updating corresponding group context of the group. For example, when a UE joins the group, a UE exits the group, a UE logging out of the group, a UE is temporarily powered off, a UE disenables reception of PUSH notification originally enabled, or a UE enables reception of PUSH notification originally disenabled, etc. In that case, the following steps may be included:

a) The PUSH Server receives an update request that carries a first identifier of a UE to be updated, wherein the first identifier of the UE may be IP address, P-TMSI, TMSI or user name, meanwhile, a second or first group identifier is also carried.

b) Updating parameter information of the UE to be updated in the group context corresponding to the first group identifier, according to the update request.

When the update request carries the second group identifier, the PUSH Server may acquire corresponding first group identifier according to the mapping relation between the first group identifier and second group identifier, and then update the parameter information of the UE to be updated in the group context corresponding to the first group identifier.

The update request may be received by the PUSH Server from the AS or the GGSN, or directly from the UE corresponding to the user. The update request may be a joining request for joining the user, and in that case, the parameter information of the user is correspondingly added to the group context. The update request may also be an exiting request of application logout, group exiting or power off of the user. Correspondingly, the PUSH Server deletes the parameter information of the user from the group context, otherwise, if the related information of the user is not deleted, a state of powered off, application logged out or group exited may be set to represent the user's state. The update request may also modify an identifier indicating whether the user enables reception of PUSH notification, and in that case corresponding PUSH Server modifies the identifier indicating whether the user enables reception of PUSH notification in the group context.

The PUSH Server may acquire a second identifier of the user according to the first identifier of the user in the update request (refer to the above embodiment for the details), and then update the parameter information of the user to be updated corresponding to the second identifier, in the group context corresponding to the first group identifier.

To be noted, when the update request is received by the PUSH Server from the AS or the GGSN, the update request may also carry the second identifier of the UE.

In which, if the PUSH Server deletes the parameter information of the user corresponding to the UE, the process of application logout, group exiting or power off of the user corresponding to the UE may also be deemed as a deactivation process of the group. In correspondence to the activation process, the deactivation process of the group context may be triggered through an interaction between the UE corresponding to the User and the AS, and between the AS and the PUSH Server, or through an interaction between UE and PUSH Server. If related information of the user is not to be deleted, a state of powered off, application logged out or group exited may be set to represent the user's state, and this process may be deemed as the update process of the group. The update process of the group context may be triggered through an interaction between the UE corresponding to the User and the AS, and between the AS and the PUSH Server, or through an interaction between UE and PUSH Server.

When the UE corresponding to the user is powered on or the route area is updated, the UE may send the location information to the Push Server, and the PUSH Server may update the location information of the UE corresponding to the user in the group. In that case, it can be deemed that a PUSH Client is provided in the corresponding UE, and the UE may send its updated route area information (also referred to as route location information) to the PUSH Server in the process of a direct communication with the PUSH Server. Or, after the user powers on or the route area is updated, corresponding SGSN sends the route location information of the UE, such as SGSN address, SGSN identifier or GGSN address, to the PUSH Server when the user corresponding to the UE finishes the Attach registration or during or after the route update process. Finally, the PUSH Server updates the location information of the UE corresponding to the user in the corresponding group context according to the updated route area information of the UE, so as to ensure the accuracy of the information in the group context. To be noted, in the Route Area Update (RAU) process of the UE in an idle state, the new SGSN corresponding to the UE notifies the PUSH Server to update the location information of the UE in the group context, such as a Route Area Identity (RAI)/Location Area Identity (LAI) of the group to which the UE belongs, so as to determine the cell or RNC to which the PUSH group message to be sent subsequently.

The UE may be switched within the same SGSN (i.e., Intra-SGSN) between different RNCs (i.e., Inter-RNC). In the locating process of the UE, the SGSN indicates the target RNC after the switching to initiate an establishment of the group PUSH bearer. Meanwhile, the SGSN needs to update the parameter information of the UE and the information of the transmission bearer in the group context established on the SGSN.

The UE may be switched between different SGSNs (i.e., Inter-SGSN) and different RNCs (i.e., Inter-RNC). In that case, a source SGSN transmits group context information related to the UE in the group context to a target SGSN, and the target SGSN indicates the RNC to initiate an establishment of the group PUSH bearer. After the switching, the target SGSN updates the group bearer with the GGSN, the SGSN notifies the PUSH Server, and the PUSH Server further updates the RAI of the UE concerned in the group context in the PUSH Server. Meanwhile, the target SGSN needs to update the parameter information of the UE and the information of the transmission bearer in the group context established on the target SGSN, so as to adequately ensure the accuracy of information in the group context of each SGSN, and ensure that the PUSH group message is ready to be sent subsequently.

In the above embodiments, the technical solutions of the present invention are all described through examples where the user joins a certain group in the AS. But in the practical applications, the user may also simultaneously join multiple groups in multiple ASs according to the implementations of the above embodiments.

To be noted, in steps 102 to 104 of the previous another embodiment, the transmission bearer between the PUSH Server and the GGSN, the GGSN and the SGSN, or the SGSN and the RNC may be established on the following occasions:

1) when the PUSH Server determines that a user joins the group;

2) when the PUSH Server determines that the number of users in the group reaches a threshold;

3) when the PUSH Server determines to establish/activate a group;

4) when the PUSH Server receives a PUSH message from the AS; and 5) when the AS notifies the PUSH Server to establish a bearer connection.

A transmission bearer based on the application type (e.g., Access Point Name (APN)), a transmission bearer based on a determined group, or a transmission bearer shared by all the groups may be established between the PUSH Server and the GGSN, the GGSN and the RNC, or the SGSN and the RNC. When an established transmission bearer needs to be applied to other newly jointed group, it only requires recording the transmission bearer in the group context corresponding to the newly jointed group. Of course, other manners may be used to indicate that the newly established transmission bearer is applicable to all the groups in the practical applications.

If the transmission bearer between the PUSH Server and the GGSN is established based on all the groups, the Push Server may indicate the first group identifier at the packet head of the downlink packet. When establishing a group Radio Access Bearer (RAB), the SGSN may send to the RNC the first group identifier, the first identifier of the user, or the number of users in one group, and such information may be put in the group context established at each node. A common bearer may be established between the RNC and the NodeB. The NodeB is provided with a notification indication physical channel, a list of bearer group identifiers, a common logical channel of a bearer notifying message, and corresponding common transmission channel and physical channel. In this example, the user joins one group, and when the user simultaneously joins multiple groups, the transmission bearer between the nodes in the embodiment of the present invention may be established in two manners.

A) The SGSN and the GGSN/RNC may establish a common transmission bearer for all the groups. The PUSH Server indicates the group identifier in the downlink packet, and establishes an IP connection with the GGSN/AS. A connection of GPRS Tunneling Protocol for the user plane (GTP-U) may also be established between the PUSH Server and the GGSN. The PUSH Server has the IP addresses of the public network and the private network. The format of a data packet that carries the group identifier is defined for the interaction between the AS and the PUSH Server. The format of a signaling packet (e.g., signaling indicating to allocate the group identifier, signaling indicating the user to join the group, signaling indicating the user to exit the group, and signaling indicating to stop receiving the PUSH message) is defined for the interaction between the AS and the PUSH Server. To be noted, in the practical applications, a permanent correspondence connection may be established between each PUSH Server and an AS, e.g., the address of the PUSH Server may be configured in the AS. When the network corresponding to an operator includes a plurality of PUSH Servers, the mapping relation between the PUSH Server and the address of the UE corresponding to the user may be configured in the AS, and the AS may determine a PUSH Server corresponding to the address of the UE corresponding to the user according to the mapping relation.

A user-level-based GTP-U user plane is established between the SGSN and the GGSN/RNC, including the interaction of Tunnel Endpoint Identifier (TEID) of the address and application type between the user plane nodes. A common RAB bearer group message may be established between the SGSN and the RNC, and a common tunnel may be established for the user plane between the RNC and the GGSN. The SGSN and the RNC may also establish a common RAB bearer and corresponding common channel for an application type (QQ, Twitter, etc.), e.g., based on an Access Point Name (APN), or establish a group context and a common transmission bearer tunnel for all the groups.

B) The SGSN and the GGSN/RNC may establish a transmission bearer for each group context, respectively, and establish a transmission bearer tunnel and an RAB for each group context, respectively, wherein the GGSN or the SGSN does not need to indicate the group identifier in the downlink packet.

In the RNC, through broadcasting the channel configuration indicated by the group notification may be performed and the channel configuration of the group list may be issued. The channel configuration may be performed when the RNC receives from the SGSN a message for establishing a group RAB or it receives a downlink group message, or the RNC counts that the users of a certain group reaches a predetermined threshold. The RNC calculates the bits indicated by the notification according to the group identifier and notifies the NodeB to send it through the Notification Indication Channel (NICH), and to send group identifier list of the group message through other physical channel. In addition, the RNC also indicates a sending time for the NodeB to send the group message, and the sending time may be a certain timing or period. Thus, the NodeB can send the group message according to the notification of the RNC.

When the number of users in the group reaches a certain threshold, the RNC sends message in a manner of PUSH group message, and when the threshold is not reached, the user may be indicated through a normal broadcasting or a dedicated signaling to stop receiving the PUSH message, and establish a point-to-point bearer to receive the group message.

Correspondingly, on the side of the UE corresponding to the user, a group PDP context may be established for all the groups. In that case, it can be deemed that the UE is provided with a client that supports reception of PUSH message, and whether to enable reception of PUSH message may also be configured. For example, the client may interact with the PUSH Server or the AS, and configure whether to receive the PUSH message. After activating the group context, the UE monitors the NICH and the Notification Control Channel (NCCH) according to the group identifier of the group context, determines whether there is any group message to be received, and further receives the group message in the Notification Transmission Channel (NCCH). The NTCH is used to transmit the PUSH message, i.e., the data content to be transmitted. The NCCH is used to transmit the first group identifier. Of course, the UE may determine whether there is any group message to be received based on other channel, such as the High-Speed Shared Control Channel (HS-SCCH) and further receive the group message in the data channel, or directly receive the data packet and determine whether there is any group message to be received based on the data packet of the user plane.

In conclusion, after a transmission bearer is established from the UE to the PUSH Server, a group context shall be established on each node of the GGSN, the SGSN and the RNC, so as to effectively manage the PUSH Server to send a group message to each UE in the group. The group context established on each node includes the parameter information of the UE (referring to the parameter information of the UE in the group context established in the PUSH Server), and the information of the transmission bearer through which the path of the PUSH message to be sent can be acquired. Preferably, the RNC and the SGSN may not need to store the IP address of the UE.

Figure 3:
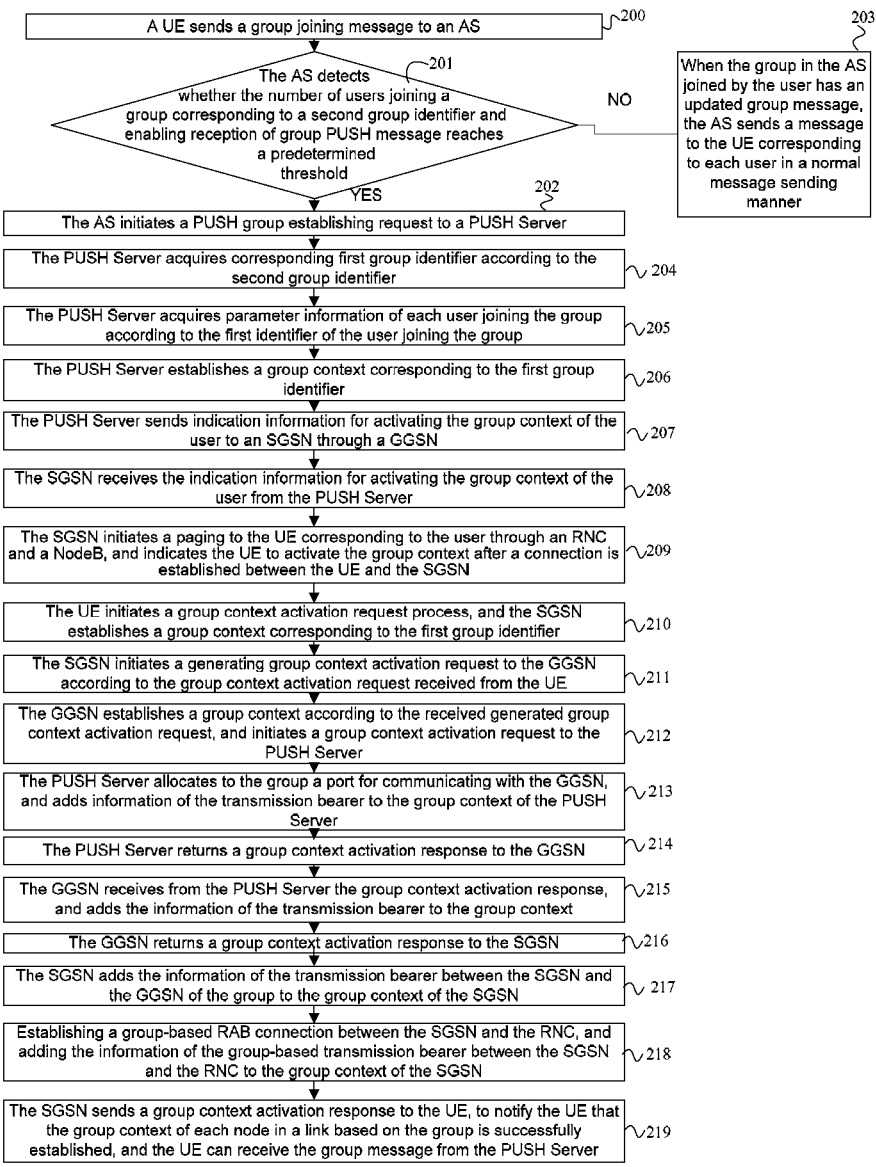
FIG. 3 is a flowchart of a group managing method provided by still another embodiment of the present invention.

FIG. 3 is a flowchart of a group managing method provided by still another embodiment of the present invention. As illustrated in FIG. 3, the group managing method of the embodiment specifically includes:

200: a UE sends a group joining message to an AS, and then step 201 is to be performed.

The group joining message includes a first identifier of a user corresponding to the UE and a second group identifier corresponding to a group in the AS to be joined by the user. In addition, when receiving the group joining message, the AS may return a group joining response message to the UE.

201: the AS detects whether the number of users joining the group corresponding to the second group identifier and enabling reception of group PUSH message reaches a predetermined threshold; if yes, performing step 202, otherwise performing step 203.

202: the AS initiates a PUSH group establishing request to a PUSH Server, and then step 204 is to be performed.

The PUSH group establishing request includes the second group identifier and the first identifier of the user joining the group.

203: when the group in the AS joined by the user has an updated group message, the AS sends a message to the UE corresponding to each user in a normal message sending manner, and please refer to the prior art for the details.

204: the PUSH Server acquires corresponding first group identifier according to the second group identifier, and then step 205 is to be performed.

For example, the PUSH Server may acquire the first group identifier corresponding to the second group identifier according to the stored table of mapping relation between the first group identifier and the second group identifier.

205: the PUSH Server acquires the parameter information of each user joining the group according to the first identifier of the user joining the group, and then step 206 is to be performed.

For example, the PUSH Server may acquire the parameter information of each user in the group through an interaction with the GGSN, the SGSN, the HSS or the HLR. Please refer to the descriptions of the above related embodiments for the details of the parameter information of the user.

206: the PUSH Server establishes a group context corresponding to the first group identifier, and then step 207 is to be performed.

207: the PUSH Server sends indication information for activating the group context of the user to an SGSN through a GGSN, and then step 208 is to be performed.

208: the SGSN receives the indication information for activating the group context of the user from the PUSH Server, and then step 209 is to be performed.

209: the SGSN initiates a paging to the UE corresponding to the user through an RNC and a NodeB, and indicates the UE to activate the group context after a connection is established between the UE and the SGSN, and then step 210 is to be performed.

In which, the activated group context of the UE carries the first group identifier corresponding to the group in the AS joined by the user corresponding to the UE.

210: the UE initiates a group context activation request process, and the SGSN establishes a group context corresponding to the first group identifier and including a second identifier of the user corresponding to the UE, then step 211 is to be performed.

211: the SGSN initiates a generated group context activation request to the GGSN according to the received group context activation request sent by the UE, and then step 212 is to be performed.

In which, the generated group context activation request carries the second identifier of the user, and a port (e.g., a first TEID) allocated by the SGSN to the group for communicating with the GGSN.

212: the GGSN establishes a group context including the parameter information of the user according to the received generated group context activation request, and initiates a group context activation request carrying a port of the GGSN for communicating with the PUSH Server to the PUSH Server, and then step 213 is to be performed.

After receiving the generated group context activation request, the GGSN allocates a second TEID for communicating with the SGSN. Meanwhile, the transmission protocol between the GGSN and the PUSH Server shall be further determined, and when it is a GDP-U-based transmission protocol, the GGSN shall allocate to the group a third TEID for communicating with the PUSH Server. When the transmission protocol between the GGSN and the PUSH Server is an IP protocol, the GGSN shall allocate to the group a first IP port for communicating with the PUSH Server.

In which, the group context activation request initiated by the GGSN to the PUSH Server carries a port of the GGSN for communicating with the PUSH Server, e.g., the third TEID and the first IP port.

213: after receiving the group context activation request, the PUSH Server allocates to the group a port for communicating with the GGSN, and adds the information of the transmission bearer to the group context of the PUSH Server, and then step 214 is to be performed.

For example, when the transmission protocol between the GGSN and the PUSH Server is a GDP-U-based transmission protocol, the PUSH Server shall allocate to the group a port for communicating with the GGSN, such as a fourth TEID corresponding to the third TEID. When the transmission protocol between the GGSN and the PUSH Server is an IP protocol, the port allocated by the PUSH Server to the group for communicating with the GGSN may be a second IP port corresponding to the first IP port. Next, the PUSH Server carries the fourth TEID or the second IP port in the group context activation response returned to the GGSN. In that case, the PUSH Server may establish a mapping relation between the third port and the fourth port, or a mapping relation between the first IP port and the second IP port, so as to record the transmission bearer between the PUSH Server and the GGSN of the group in the group context.

214: the PUSH Server returns a group context activation response to the GGSN, and then step 215 is to be performed.

215: the GGSN receives from the PUSH Server the group context activation response that carries the port allocated by the PUSH Server to the group for communicating with the GGSN, and adds the information of the transmission bearer to the group context, and then step 216 is to be performed.

After receiving from the PUSH Server the group context activation response, the GGSN may establish a mapping relation between the third port and the fourth port, or a mapping relation between the first IP port and the second IP port, so as to record the transmission bearer between the GGSN and the PUSH Server of the group in the group context.

216: the GGSN returns a group context activation response to the SGSN, and then step 217 is to be performed.

217: the SGSN receives from the GGSN the group context activation response that carries a second TEID allocated by the GGSN to the group for communicating with the SGSN, and adds the information of the transmission bearer between the SGSN and the GGSN of the group to the group context of the SGSN, then step 218 is to be performed In which, the details of the second TEID have been described in step 212.

For example, after receiving the group context activation response, the SGSN can establish a mapping relation between the first TEID and the second TEID, and record the transmission bearer between the SGSN and the GGSN of the group in the group context

218: establishing a group-based RAB connection between the SGSN and the RNC, and adding the information of the group-based transmission bearer between the SGSN and the RNC to the group context of the SGSN, and then step 219 is to be performed.

To be noted, the process of establishing a group-based RAB connection between the SGSN and the RNC herein is the same as that of establishing a normal RAB connection between the SGSN and the RNC in the prior art, please refer to related prior art for the details. The difference only lies in that the RAB connection between the SGSN and the RNC in the embodiment is shared based on a group.

219: the SGSN sends a group context activation response to the UE, to notify the UE that the group context of each node in a link based on the group is successfully established, and the UE can receive the group message from the PUSH Server.

The above steps of the embodiment are described through an example where the group context is established on each node for the first time. The group context established on each node of the PUSH Server, the GGSN, the SGSN and the RNC includes two parts: the parameter information of the user, and the information of the transmission bearer established for the group message to be transmitted. In that case, based on such network architecture, the PUSH Server may manage the users joining the groups in the AS on a group basis, and send the message of a group in the AS to UEs under the group at one time based on the group.

In a group of the AS corresponding to the second group identifier, when the location of a user changes, a user joins or exits, or an identifier of a user indicating whether to enable reception of PUSH notification changes, a UE corresponding to the user may initiate an update request to the PUSH Server, so as to update related information in the group context. Please refer to the descriptions of related method embodiments for the details, so as to synchronize the group contexts on respective nodes.

The technical solution of the embodiment solves the defect in the prior art that the users in the same group cannot be managed uniformly at the network side based on the groups in the AS, performs a uniform management of the users in the same group in the AS, and improves the group management efficiency.

A person skilled in the art shall appreciate that all or a part of the steps in the above method embodiments may be implemented by instructing relevant hardware through a program that may be stored in a computer readable storage medium. When the program is executed, the steps of the method embodiments are carried out. The storage medium includes any medium capable of storing program codes, such as Read-Only Memory (ROM), Random Access Memory (RAM), magnetic disc or optical disc.

Figure 4:
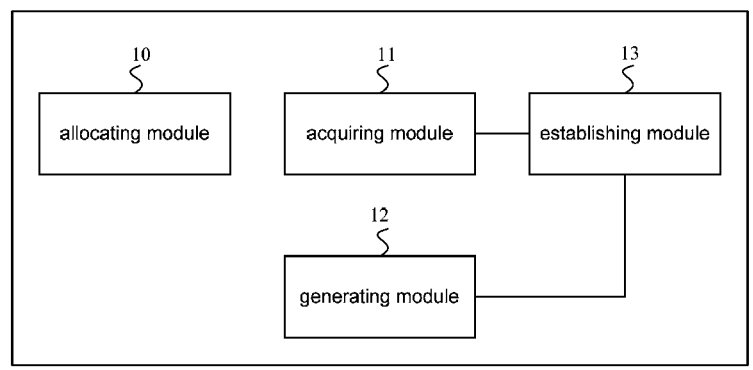
FIG. 4 is a structure diagram of a PUSH Server provided by an embodiment of the present invention.

FIG. 4 is a structure diagram of a PUSH Server provided by an embodiment of the present invention. As illustrated in FIG. 4, the PUSH Server of the embodiment includes an allocating module 10, an acquiring module 11, an establishing module 12 and a generating module 13.

In which, the allocating module 10 is configured to allocate a first group identifier to a group in an AS. The acquiring module 11 is configured to acquire, according to a first identifier of a user joining the group corresponding to the first group identifier, parameter information of the user which includes a second identifier of the user, location information of a UE corresponding to the user, and an identifier indicating whether the user enables reception of PUSH notification. The establishing module 12 is configured to establish a group-based transmission bearer with a core network node. The generating module 13 is connected to the acquiring module 11 and the establishing module 12, respectively, and configured to generate a group context corresponding to the first group identifier, according to the parameter information of the user acquired by the acquiring module 11 and the group-based transmission bearer with the core network node established by the establishing module 12, wherein the group context includes the parameter information of the user in the group and information of the transmission bearer.

For the details of the first identifier of the user, the second identifier of the user, the core network node and the location information of the UE corresponding to the user, please refer to the descriptions of related method embodiments, and herein are omitted.

In the embodiment, the PUSH Server implements a group-based PUSH mechanism management using the above modules in the same way as related method embodiments, the details have been described in related method embodiments, and herein are omitted.

In the embodiment, the PUSH Server uses the above modules to allocate the first group identifier to the group in the AS; acquires, according to the first identifier of the user joining the group, the parameter information of the user which includes the second identifier of the user, the location information of the UE corresponding to the user, and the identifier indicating whether the user enables reception of PUSH notification; establishes the group-based transmission bearer with the core network node; generates the group context corresponding to the group identifier and including the parameter information of the user in the group and the information of the transmission bearer. The technical solution of the embodiment performs a uniform management of the users in the same group in the AS according to the generated group context, thereby solving the defect in the prior art that the users in the same group cannot be managed uniformly based on the groups in the AS, and effectively improves the group management efficiency.

Figure 5:
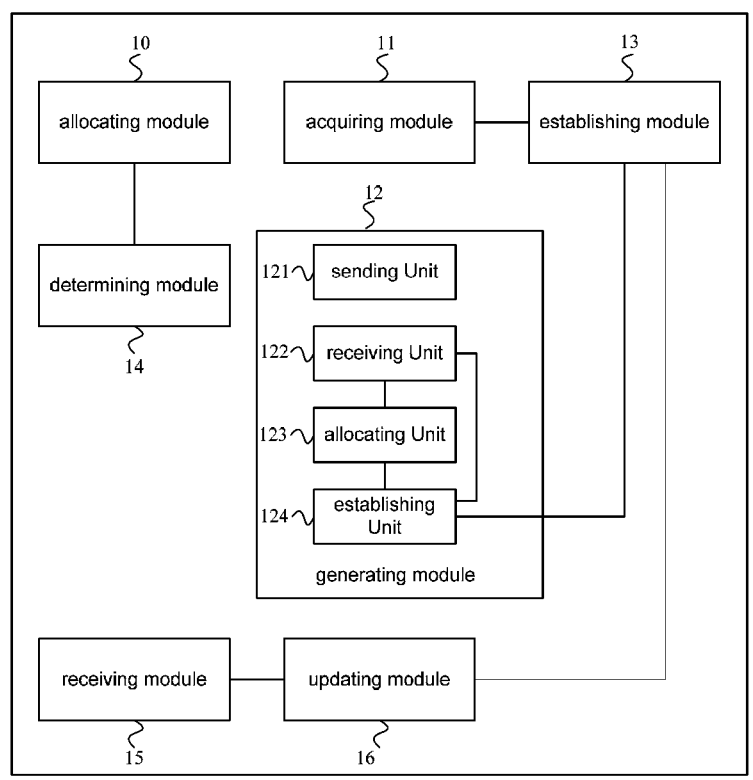
FIG. 5 is a structure diagram of a PUSH Server provided by another embodiment of the present invention.

FIG. 5 is a structure diagram of a PUSH Server provided by another embodiment of the present invention. As illustrated in FIG. 5, based on the embodiment corresponding to FIG. 4, the PUSH Server in the embodiment further includes: a determining module 14 configured to determine that the number of users joining the group and enabling reception of PUSH notification reaches a predetermined threshold. The determining module 14 may be connected to the allocating module 10, so as to trigger the allocating module 10 to allocate the first group identifier to the group in the AS after determining that the number of users joining the group and enabling reception of PUSH notification reaches the predetermined threshold.

In the PUSH Server of the embodiment, the acquiring module 11 is specifically con FIGured to acquire parameter information of a UE joining the group according to the identifier of the UE from a core network node, an HSS or an HLR, wherein the core network node may be a GGSN or an SGSN.

In the PUSH Server of the embodiment, the establishing module 12 may specifically include a sending unit 121, a receiving unit 122, an allocating unit 123 and an establishing unit 124.

In which, the sending unit 121 is configured to send indication information to the SGSN through the GGSN, when the core network node includes the GGSN and the SGSN, wherein the indication information includes a first identifier of the user included in the group and a first group identifier, and the indication information is used to indicate the SGSN to notify the user corresponding to the first identifier to activate the group context. The receiving unit 122 is corresponding to the sending unit 121 and configured to receive from the GGSN a group context activation request, which is sent by the GGSN according to a generated group context activation request received from the SGSN, while the generated group context activation request is sent by the SGSN according to a group context activation request sent by the UE, and the group context activation request sent by the GGSN includes a first communication port allocated by the GGSN to the group. The allocating unit 123 is connected to the receiving unit 122 and configured to allocate to the group a second communication port for communicating with the GGSN, after the receiving unit 122 receives the group context activation request sent by the GGSN. The establishing unit 124 is connected to the receiving unit 122 and the allocating unit 123, respectively, and configured to establish a transmission bearer with the GGSN according to the first communication port received by the receiving unit 122 and the second communication port allocated by the allocating unit 123. In that case, the generating module 13 is connected to the establishing unit 124, and configured to generate a group context corresponding to the first group identifier according to the parameter information of the UE acquired by the acquiring module 11 and the group-based transmission bearer with the GGSN established by the establishing unit 124.

In which, the establishing unit 124 is further configured to establish a mapping relation between the first group identifier and a second group identifier corresponding to the group in the AS.

The PUSH Server of the embodiment further includes a receiving module 15 and an updating module 16.

In which, the receiving module 15 is configured to receive an update request that carries a first identifier of a user to be updated and the second group identifier, or carries a first identifier of a user to be updated and the first group identifier. The updating module 16 is connected to the receiving module 15 and the generating module 13, respectively, and configured to update the parameter information of the user to be updated in the group context corresponding to the first group identifier generated by the generating module 13 according to the update request received by the receiving module 15.

When the update request received by the receiving module 15 carries the second group identifier, the receiving module 15 shall be further connected to the establishing unit 124, so as to acquire the first group identifier corresponding to the second group identifier received by the receiving module 15 according to the mapping relation between the first group identifier and second group identifier. Next, the updating module 16 updates the parameter information of the user to be updated in the group context corresponding to the first group identifier. In the above technical solution, the receiving module 15 is specifically configured to receive the update request sent by the AS, the update request sent by the UE corresponding to the user to be updated, or the update request sent by the GGSN. Please refer to the descriptions of related method embodiments for details.

In the embodiment, the PUSH Server implements a group-based PUSH mechanism management using the above modules in the same way as related method embodiments, the details have been described in related method embodiments, and herein are omitted.

The PUSH Server of the embodiment can effectively manage the users in the groups in the AS through the above modules, thereby solving the defect in the prior art that the users in the same group cannot be managed uniformly on the network side based on the groups in the AS, performing a uniform management of the users in the same group in the AS, and improving the group management efficiency.

Figure 6:
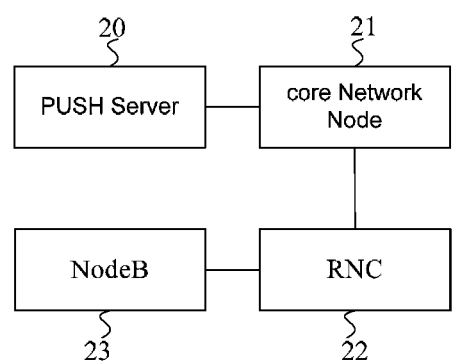
FIG. 6 is a structure diagram of a communication network system provided by an embodiment of the present invention.

FIG. 6 is a structure diagram of a communication network system provided by an embodiment of the present invention. As illustrated in FIG. 6, the communication network of the embodiment includes a PUSH Server 20, a core network node 21, an RNC 22 and a NodeB 23.

The PUSH Server 20 is communicatively connected to an AS of an external network, wherein the AS in the embodiment may be a Twitter server, a QQ server, an MSN server, etc.

The PUSH Server 20 is configured to allocate a first group identifier to a group in the AS; acquire, according to a first identifier of a user joining the group, parameter information of the user which includes a second identifier of the user, location information of a UE corresponding to the user, and an identifier indicating whether the user enables reception of PUSH notification; establishes a group-based transmission bearer with a core network node; and generates a group context corresponding to the first group identifier, wherein the group context includes the parameter information of the user in the group and information of the transmission bearer.

In the embodiment, the PUSH Server 20 can effectively manage users in the same group based on the groups in the AS, e.g., subsequently sending a PUSH message to all users in the same group, so as to effectively save the network resources. The PUSH Server 20 and the GGSN may be provided together, and the core network node 21 in the embodiment may be an SGSN. When the PUSH Server 20 and the GGSN are provided separately, the core network node 21 in the embodiment includes the GGSN and the SGSN. In that case, the PUSH Server 20 is communicatively connected to the GGSN, e.g., the PUSH Server 20 may send an activation request for activating the group context to the SGSN through the GGSN, so as to indicate the SGSN to notify, through the RNC 22 and the NodeB 23, the user to activate the group context, wherein the network architecture among the GGSN, the SGSN, the RNC 22 and the NodeB 23 is the same as that in the prior art, please refer to the prior art for the details, and herein is omitted.

For the implementation of the group managing method by the communication network, please refer to related method embodiment, and herein is omitted.

In the communication network of the embodiment, through the PUSH Server, the users in the group in the AS can be effectively managed, thereby solving the defect in the prior art that the users in the same group cannot be uniformly managed at the network side based on the groups in the AS, performing a uniform management of the users in the same group in the AS, and improving the group management efficiency.

A person skilled in the art can clearly appreciate that in order to describe concisely and conveniently, only divisions of the above functional modules are given as examples, and in practical applications, those functions may be performed by different functional modules upon demand, i.e., the internal structure of the device may be divided into different functional modules to complete all or a part of the described functions. For the detailed working processes of the described system, device and units, please refer to corresponding processes in the method embodiments, and herein are omitted.

In the embodiments provided by the present application, it shall be appreciated that the disclosed system, device and method may be implemented in other ways. For example, the above device embodiments are just exemplary. For example, the module or unit division is just a logical function division, and other division mode may be used in the implementation, e.g., multiple units or components may be combined or integrated into another system, or some features may be omitted or not executed. Another point is that the displayed or discussed mutual coupling, direct coupling or communication connection may be implemented through indirect coupling or communication connection between some interfaces, devices or units in electrical, mechanical or other forms.

The above device embodiments are just exemplary, wherein the units described as separate parts may be or may not be physically separated, and the parts displayed as units may be or may not be physical units, i.e., they may be located at the same place or distributed to at least two network elements. The object of the solution of the embodiment may be achieved by selecting parts or all of the modules upon actual demand. The present invention can be understood and implemented by a person skilled in the art without paying any creative effort.

In addition, various functional units in the embodiments of the present invention may be integrated into one processing unit, or existed as individual physical units, or two or more units may be integrated into one unit. The integrated units may be implemented in the form of hardware or software functional units.

When the integrated units are implemented in the form of software functional units and sold or used as individual products, they may be stored in a computer readable access medium. Based on such understanding, the technical solution of the present invention substantively, a part thereof making a contribution to the prior art, or the whole or a part of the technical solution, may be reflected in the form of software product which is stored in a storage medium, including several instructions to enable a computer device (e.g., personal computer, server, network facility, etc.) or a processor to execute all or a part of the steps of the methods of respective embodiments. The storage medium includes various mediums capable of storing the program codes, such as U-disc, mobile hard disc, Read-Only Memory (ROM), Random Access Memory (RAM), magnetic disc, optical disc, etc.

Finally to be noted, the above embodiments are just used to describe the technical solutions of the present invention, rather than making limitations thereto. Although the present invention is described in details with reference to the above embodiments, a person skilled in the art shall appreciate that the technical solutions of the above embodiments can be modified, or some technical features thereof can be equivalently substituted, while those modifications or substitutions do not cause the essences of corresponding technical solutions to deviate from the range of the technical solutions of the embodiments of the present invention.

What is claimed is:

1. A group managing method, comprising:
allocating, by a PUSH server, a first group identifier to a user group in an application server, wherein the first group identifier comprises a public land mobile-communication network (PLMN) identifier and a second group identifier, in which the first group identifier is a unique identifier used in the mobile network and transmitted at the air interface, and the second group identifier is an identifier used by the user equipment in the application server;
acquiring, by the PUSH server, according to a first identifier of a user joining the user group, parameter information of the user in a mobile network, wherein the parameter information of the user comprises a second identifier of the user, location information of a user equipment corresponding to the user, and an identifier indicating whether the user enables reception of a PUSH notification, wherein the identifier indicates that when there is an updated group message in the user group, the PUSH server sends the updated group message to the user which enables the reception of PUSH notification in the user group;
establishing, by the PUSH server, a group-based transmission bearer with a core network node, wherein when the core network node comprises a gateway general packet radio service (GPRS) support node (GGSN) and a service GPRS support node (SGSN), a transmission bearer with the GGSN is established by the PUSH server according to a first communication port and a second communication port, in which the first communication port is allocated by the GGSN to the user group and the second communication port is allocated the PUSH server for communicating with the GGSN to the user group; and
generating, by the PUSH server, a group context corresponding to the first group identifier, wherein the group context comprises the parameter information of the user in the user group and information of the group-based transmission bearer.

2. The method according to claim 1, before the step of allocating, by the PUSH server, the first group identifier to a user group in an application server, further comprising:
setting, by the PUSH server, a predetermined threshold of a number of users enabling reception of PUSH notification;
detecting, by the PUSH server, a number of users enabling reception of PUSH notification in the user group and comparing the detected number with the predetermined threshold; and
ensuring, by the PUSH server, that the number of users enabling reception of the PUSH notification reaches the predetermined threshold.

3. The method according to claim 1, wherein the acquiring, by the PUSH server, according to the first identifier of the user joining the user group, the parameter information of the user comprises:
according to the first identifier of the user joining the user group, acquiring, by the PUSH server, one of the following (a), (b) and (c): (a) the parameter information of the user from the core network node, (b) a home subscriber service (HSS), and (c) a home location register (HLR).

4. The method according to claim 1, wherein the establishing, by the PUSH server, the group-based transmission bearer with the core network node comprises:
when the core network node comprises a gateway general packet radio service (GPRS) support node (GGSN) and a service GPRS support node (SGSN), sending, by the PUSH server, indication information to the SGSN through the GGSN, wherein the indication information carries the first identifier of the user and the first group identifier, and the indication information is used to indicate the SGSN to notify the user corresponding to the first identifier to activate the group context;
receiving, by the PUSH server, from the GGSN a first group context activation request, which is sent by the GGSN according to a generated group context activation request received from the SGSN, while the generated group context activation request is sent by the SGSN according to a second group context activation request sent by the user, wherein the first group context activation request sent by the GGSN comprises the first communication port allocated by the GGSN to the user group;
allocating, by the PUSH server, the second communication port for communicating with the GGSN to the user group; and
establishing, by the PUSH server, a transmission bearer with the GGSN according to the first communication port and the second communication port.

5. The method according to claim 4, further comprising:
establishing, by the PUSH server, a mapping relation between the first group identifier and the second group identifier corresponding to the user group in the application server,
when the application server sends a joining request of the user to the PUSH server, acquiring, by the PUSH server, that the user joins the group corresponding to the first group identifier according to the mapping relation between the first group identifier and the second group identifier.

6. The method according to claim 5, further comprising:
receiving, by the PUSH server, an update request that carries a first identifier of a user to be updated and the second group identifier, or the update request carries the first identifier of the user to be updated and the first group identifier; and
updating, by the PUSH server, the parameter information of the user to be updated in the group context corresponding to the first group identifier, according to the update request.

7. The method according to claim 6, wherein the receiving, by the PUSH server, the update request comprises:
receiving, by the PUSH server, one of the following (a), (b) and (c): (a) the update request sent by the application server, (b) the update request sent by the user to be updated, and (c) the update request sent by the GGSN.

8. The method according to claim 1, wherein if the first identifier is a private IP, then the second identifier is a temporary mobile subscriber identity (TMSI), a packet-TMSI (P-TMSI) or an international mobile subscriber identity (IMSI); or
if the first identifier is the TMSI or the P-TMSI, then the second identifier is the TMSI, the P-TMSI or the IMSI.

9. A PUSH server, comprising:
a first processor, configured to allocate a first group identifier to a user group in an application server, wherein the first group identifier comprises a public land mobile-communication network (PLMN) identifier and a second group identifier, in which the first group identifier is a unique identifier used in the mobile network and transmitted at the air interface, and the second group identifier is an identifier used by the user equipment in the application server;

a second processor, configured to acquire, according to a first identifier of a user joining the user group, parameter information of the user in a mobile network, wherein the parameter information of the user comprises a second identifier of the user, location information of a user equipment corresponding to the user, and an identifier indicating whether the user enables reception of a PUSH notification, wherein the identifier indicates that when there is an updated group message in the user group, the PUSH server sends the updated group message to the user which enables the reception of PUSH notification in the user group;

a third processor, configured to establish a group-based transmission bearer with a core network node, wherein when the core network node comprises a gateway general packet radio service (GPRS) support node (GGSN) and a service GPRS support node (SGSN), a transmission bearer with the GGSN is established by the PUSH server according to a first communication port and a second communication port, in which the first communication port is allocated by the GGSN to the user group and the second communication port is allocated the PUSH server for communicating with the GGSN to the user group; and a forth processor, configured to generate a group context corresponding to the first group identifier, wherein the group context comprises the parameter information of the user in the user group and information of the group-based transmission bearer.

10. The PUSH Server according to claim 9, before the first processor, further comprising:

a fifth processor, configured to set a predetermined threshold of a number of users enabling reception of PUSH notification, detect a number of users enabling reception of PUSH notification in the user group and compare the detected number with the predetermined threshold and ensuring that the number of user enabling reception of the PUSH notification reaches the predetermined threshold.

11. The PUSH Server according to claim 9, wherein the second processor is configured to acquire, one of the following (a), (b) and (c): (a) the parameter information of the user from the core network node, (b) a home subscriber service (HSS), and (c) a home location register (HLR) according to the first identifier of the user joining the user group.

12. The PUSH Server according to claim 9, further comprising:

a transmitter, configured to send indication information to a gateway general packet radio service (GPRS) support node (GGSN) and a service GPRS support node (SGSN), when the core network node comprises the GGSN and the SGSN, wherein the indication information carries the first identifier of the user and the first group identifier, and the indication information is used to indicate the SGSN to notify the user corresponding to the first identifier to activate the group context; and a receiver, configured to receive from the GGSN a first group context activation request, which is sent by the GGSN according to a generated group context activation request received from the SGSN, while the generated group context activation request is sent by the SGSN according to a second group context activation request sent by the user, wherein the first group context activation request sent by the GGSN comprises the first communication port allocated by the GGSN to the user group;

wherein, the first processor is further configured to allocate to the user group the second communication port for communicating with the GGSN; and the third processor is further configured to establish a transmission bearer with the GGSN according to the first communication port and the second communication port.

13. The PUSH Server according to claim 12, wherein the third processor is further configured to establish a mapping relation between the first group identifier and the second group identifier corresponding to the user group in the application server; when the application server sends a joining request of the user to the PUSH server, acquire that the user joins the group corresponding to the first group identifier according to the mapping relation between the first group identifier and the second group identifier.

14. The PUSH Server according to claim 13, wherein the receiver is further configured to receive an update request that carries a first identifier of a user to be updated and the second group identifier, or the update request carries the first identifier of the user to be updated and the first group identifier; and the PUSH Server is further comprises a sixth processor, configured to update the parameter information of the user to be updated in the group context corresponding to the first group identifier, according to the update request.

15. The PUSH Server according to claim 14, wherein the receiver is further configured to receive one of the following (a), (b) and (c): (a) the update request sent by the application server, (b) the update request sent by the user to be updated, and (c) the update request sent by the GGSN.

16. The PUSH Server according to claim 9, wherein if the first identifier is a private IP, then the second identifier is a temporary mobile subscriber identity (TMSI), a packet-TMSI (P-TMSI) or an international mobile subscriber identity (IMSI); or if the first identifier is the TMSI or the P-TMSI, then the second identifier is the TMSI, the P-TMSI or the IMSI.

17. A non-transitory machine-readable medium having stored thereon, a computer program comprising at least one code section for distributing data, the at least one code section being executable by a PUSH Server for causing the PUSH Server to perform the following:

allocating a first group identifier to a user group in an application server, wherein the first group identifier comprises a public land mobile-communication network (PLMN) identifier and a second group identifier, in which the first group identifier is a unique identifier used in the mobile network and transmitted at the air interface, and the second group identifier is an identifier used by the user equipment in the application server;

acquiring according to a first identifier of a user joining the user group, parameter information of the user in a mobile network, wherein the parameter information of the user comprises a second identifier of the user, location information of a user equipment corresponding to the user, and an identifier indicating whether the user enables reception of PUSH notification, wherein the identifier indicates that when there is an updated group message in the user group, the PUSH Server sends the updated group message to the user which enables the reception of PUSH notification in the user group;

establishing a group-based transmission bearer with a core network node, wherein when the core network node comprises a gateway general packet radio service (GPRS) support node (GGSN) and a service GPRS support node (SGSN), a transmission bearer with the GGSN is established by the PUSH server according to a first communication port and a second communication port, in which the first communication port is allocated by the GGSN to the user group and the second communication port is allocated the PUSH server for communicating with the GGSN to the user group; and generating a group context corresponding to the first group identifier, wherein the group context comprises the parameter information of the user in the user group and information of the group-based transmission bearer.

18. The non-transitory machine-readable medium according to claim 17, wherein the PUSH Server is further configured to perform the following:

setting a predetermined threshold of a number of users enabling reception of PUSH notification detecting a number of users enabling reception of PUSH notification in the user group and comparing the detected number with the predetermined threshold; and ensuring the number of user enabling reception of the PUSH notification reaches the predetermined threshold.

19. The non-transitory machine-readable medium according to claim 17, wherein the PUSH Server is further configured to perform the following:

acquiring, one of the following (a), (b) and (c): (a) the parameter information of the user from the core network node, (b) a home subscriber service (HSS), and (c) a home location register (HLR), according to the first identifier of the user joining the user group.

20. The non-transitory machine-readable medium according to claim 17, wherein the PUSH Server is further configured to perform of the following:

when the core network node comprises a gateway general packet radio service (GPRS) support node (GGSN) and a service GPRS support node (SGSN), sending indication information to the SGSN through the GGSN, wherein the indication information carries the first identifier of the user and the first group identifier, and the indication information is used to indicate the SGSN to notify the user corresponding to the first identifier to activate the group context;

receiving from the GGSN a first group context activation request, which is sent by the GGSN according to a generated group context activation request received from the SGSN, while the generated group context activation request is sent by the SGSN according to a second group context activation request sent by the user, wherein the first group context activation request sent by the GGSN comprises the first communication port allocated by the GGSN to the user group;

allocating the second communication port for communicating with the GGSN to the user group; and establishing a transmission bearer with the GGSN according to the first communication port and the second communication port.

\* \* \* \* \*